United States Patent Office 2,838,503
Patented June 10, 1958

2,838,503
6-FLUORO STEROIDS

Milton E. Herr, Kalamazoo, John C. Babcock, Portage Township, Kalamazoo County, and J Allan Campbell, John A. Hogg, and Raymond L. Pederson, Kalamazoo, Mich., assignors to The Upjohn Company, Kalamazoo, Mich., a corporation of Michigan No Drawing. Application February 19, 1958
Serial No. 716,038
40 Claims. (Cl. 260—239.55)

The present invention relates to new 6α- and 6β-fluorinated steroids and is more particularly concerned with certain 6-fluoro-11-oxygenated-17β-hydroxy-17α-alkyl-4-androstenes and the 17-acylates thereof, for example, 6-fluoro-17β-hydroxy-17α-alkyl-4-androstene-3,11-diones (6-fluoro-11-keto-17α-alkyltestosterones), 6-fluoro 17β-hydroxy-17α-alkyl-19-nor-4-androstene-3,11-diones (6-fluoro-11-keto-17α-alkyl-19-nortestosterones), 6-fluoro-11β,-17β-dihydroxy-17α-alkyl-4-androsten-3 - ones (6 - fluoro-11β-hydroxy-17α-alkyltestosterones), 6-fluoro-11β,17β-dihydroxy-17α-alkyl-19-nor-4-androsten-3 - ones (6 - fluoro-11β-hydroxy-17α-alkyl-19-nortestosterones), 6,9α-difluoro-17β-hydroxy-17α-alkyl-4-androstene-3,11-diones (6,9α-difluoro-11-keto-17α - alkyltestosterones), 6,9α - difluoro-17β-hydroxy-17α-alkyl-19-nor-4-androstene - 3,11 - diones 6,9α-difluoro-11-keto-17α-alkyl-19-nortestosterones), 6,9α-difluoro-11β,17β-dihydroxy-17α-alkyl-4-androsten - 3-ones (6,9α-difluoro-11β-hydroxy-17α-alkyltestosterones), 6,9α-difluoro-11β,17β-dihydroxy-17α-alkyl-19-nor-4-androsten-3-ones (6,9α-difluoro-11β-hydroxy-17α-alkyl-19-nortestosterones), the 17-acylates thereof and novel steroid intermediates and methods used in the preparation thereof.

The novel end product compounds of this invention are represented by the formula:

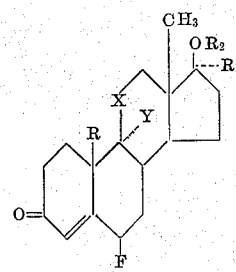

wherein R represents hydrogen or methyl, $R_1$ represents a "lower alkyl" radical, $R_2$ represents hydrogen or an acyl radical of an organic carboxylic acid, preferably a hydrocarbon carboxylic acid, containing from one to twelve carbon atoms, inclusive, Y represents hydrogen or fluorine, and X represents a carbonyl radical ($>C=O$) or a hydroxymethylene radical ($>CHOH$). The term "lower alkyl" radical as used herein refers to an alkyl radical of from one to eight carbon atoms, inclusive, e. g., methyl, ethyl, propyl, butyl, amyl, hexyl, isopropyl, 3-methylpentyl, octyl, and the like.

It is an object of the present invention to provide novel 6-fluoro-17β-hydroxy-17α-alkyl-4-androstene-3,11-diones, 6-fluoro-17β-hydroxy-17α-alkyl-19-nor-4-androstene-3,11-diones, 6-fluoro-11β,17β-dihydroxy-17α-alkyl-4-androsten-3-ones, 6-fluoro-11β,17β-dihydroxy-17α-alkyl-19-nor-4-androsten-3-ones, 6,9α-difluoro - 17β - hydroxy-17α-alkyl-4-androstene-3,11-diones, 6,9α-difluoro-17β-hydroxy-17α-alkyl-19-nor-4-androstene-3,11-diones, 6,9α-difluoro-11β,17β-dihydroxy-17α-alkyl-4-androsten - 3-ones, 6,9α-difluoro-11β,17β-dihydroxy-17α-alkyl-19-nor - 4 - androsten-3-ones, the 17-acylates thereof, and novel intermediates and methods in the production thereof. Other objects will be apparent to those skilled in the art to which this invention pertains.

The novel end products of this invention, the compounds of Formula I, possess useful therapeutic properties. They are orally active anabolic-androgenic agents. The compounds of Formula I affect the secretion of gonadotropins and thus regulate ovulation and endometrial and placental development and, particularly when used in conjunction with estrogens, e. g., ethinylestradiol, reduce fertility and constitute effective therapy for dysmenorrhea, amenorrhea, endometriosis, threatened absortion and related gynecological disorders. Administration of the steroids of Formula I can be in conventional dosage forms such as pills, tablets, capsules, syrups, or elixirs for oral use, or in liquid forms which are adaptable to the natural and synthetic steroid hormones for injectable products.

The compounds of Formula I, are prepared according to the following reaction sequence:

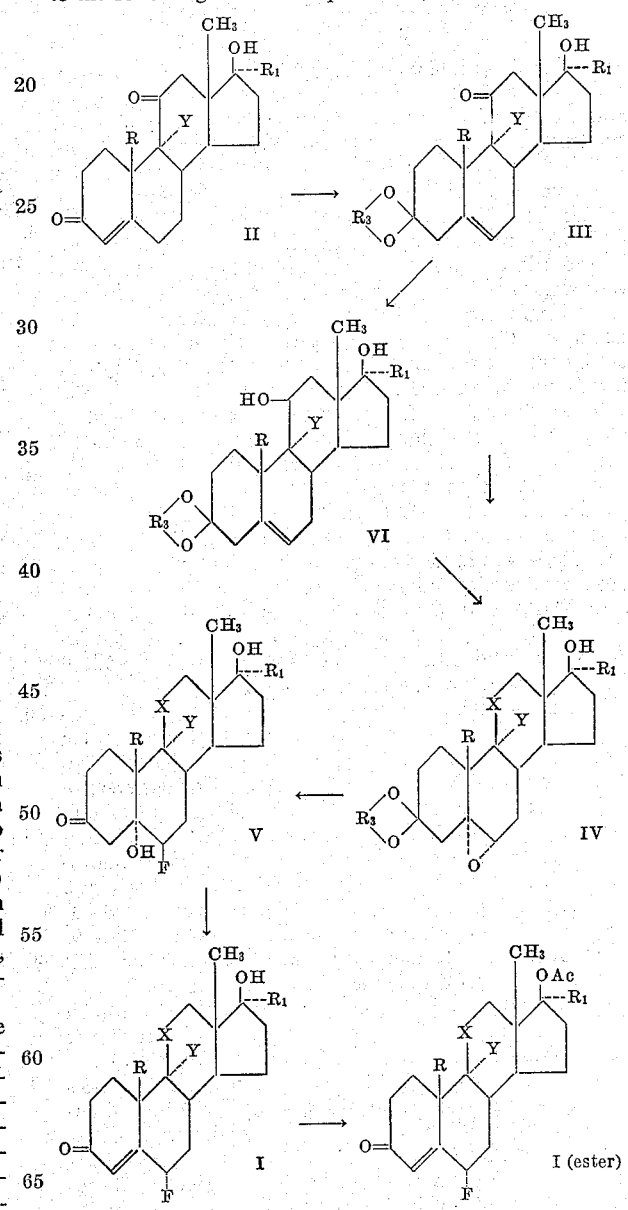

wherein R, $R_1$, X and Y have the same meaning previously given, $R_3$ is an alkylene radical containing not more than eight carbon atoms, inclusive, and the attaching oxygen to carbon bonds are separated by a chain of at least two and not more than three carbon atoms, and Ac represents the acyl radical of an organic carboxylic acid, preferably a hydrocarbon carboxylic acid, containing from one to twelve carbon atoms, inclusive.

Compounds of the type represented by Formula II, for example, 17β-hydroxy-17α-alkyl-4-androstene-3,11-diones and 17β-hydroxy-17α-alkyl-19-nor-4-androstene-3,11-diones, are allowed to react with a diol, preferably ethylene glycol, in the presence of a strong acid such as toluenesulfonic acid, orthochlorobenzenesulfonic acid, sulfuric acid, and the like, to produce the compounds of Formula III, for example, 17β-hydroxy-17α-alkyl-5-androstene-3,-11-dione 3-ethylene ketals and 17β-hydroxy-17α-alkyl-19-nor-5-androstene-3,11-dione 3-ethylene ketals. Similarly the compounds of Formula II can be allowed to react with other 1,2-alkane diols or 1,3-alkane diols such as propylene glycol, butane-1,2-diol, butane-1,3-diol, pentane-1,2- and 1,3-diol, hexane-1,2- and 1,3-diol, heptane-1,2- and 1,3-diol, octane-1,2- and 1,3-diol or other alkane diols of the formula:

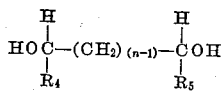

wherein $n$ is an integer having a value of from one to two, inclusive, and $R_4$ and $R_5$ each represent hydrogen or lower alkyl radicals containing up to six carbon atoms and wherein the total number of carbon atoms in the alkane diol is up to and including eight carbon atoms, to obtain the corresponding 3-alkylene ketals of Formula III.

The thus-obtained compounds of Formula III are treated with a reducing agent, preferably lithium aluminum hydride, in the presence of an inert organic solvent, for example, anhydrous ether, and preferably under nitrogen, to convert them into the compounds of Formula VI, for example, 11β,17β-dihydroxy-17α-alkyl-5-androsten-3-one 3-ethylene ketals and 11β,17β-dihydroxy-17α-alkyl-19-nor-5-androsten-3-one 3-ethylene ketals.

The compounds of Formulae III and VI are then allowed to react with a peracid such as peracetic or perbenzoic acid to obtain the corresponding 5,6-epoxy-11-oxygenated compounds represented by Formula IV, for example, 5α,6α-epoxy-17β-hydroxy-17α-alkylandrostane-3,-11-dione 3-ethylene ketals and 5α,6α-epoxy-17β-hydroxy-17α-alkyl-19-norandrostane-3,11-dione 3-ethylene ketals, produced from the compounds of Formula III, and 5α,6α-epoxy-11β,17β-dihydroxy-17α-alkylandrostan-3-one 3-ethylene ketals and 5α,6α-epoxy-11β,17β-dihydroxy-17α-alkyl-19-norandrostan-3-one 3-ethylene ketals, produced from the compounds of Formula VI.

The thus-obtained compounds of Formula IV, for example, 5α,6α-epoxy-11-oxygenated compounds, are then treated with a fluorine releasing agent, for example, hydrofluoric acid, in the presence of an organic solvent inert to the reaction, preferably methylene chloride, to obtain the compounds fo Formula V, for example, 6β-fluoro-5α,-17β-dihydroxy-17α-alkylandrostane-3,11-diones, 6β-fluoro-5α,17β-dihydroxy-17α-alkyl-19-norandrostane-3,11-diones, 6β-fluoro-5α,11β,17β-trihydroxy-17α-alkylandrostan-3-ones and 6β-fluoro-5α,11β,17β-trihydroxy-17α-alkyl-19-norandrostan-3-ones and are recovered by conventional means, such as for example, chromotography.

The thus-obtained compounds of Formula V are then allowed to react with a mineral acid such as hydrochloric acid to convert them into the compounds of Formula I such as, 6α-fluoro-17β-hydroxy-17α-alkyl-4-androstene-3,-11-diones, 6α-fluoro-17β-hydroxy-17α-alkyl-19-nor-4-androstene-3,11-diones, 6α-fluoro-11β,17β-dihydroxy-17α-alkyl-4-androsten-3-ones and 6α-fluoro-11β,17β-dihydroxy-17α-alkyl-19-nor-4-androsten-3-ones. The reaction is carried out in a liquid medium such as an organic solvent, for example, chloroform, methylene chloride, ether, and the like, and in the presence of a prototropic agent (a proton donating agent) such as water, alcohols, and organic acids while maintaining the temperature at zero degrees centigrade or slightly lower. Advantageously, such temperatures should be maintained throughout the period of contact with the acid. Following the termination of the reaction, the reaction mixture can then be washed with successive portions of water, a solution of alkali, such as sodium bicarbonate, and water, and evaporated to obtain the 6α-fluoro compounds of Formula I.

The 17-acylates represented for Formula I (ester) are obtained by allowing the compounds of Formula I to react with the anhydride of an organic carboxylic acid, particularly a hydrocarbon carboxylic acid, containing from one to twelve carbons, inclusive, for example, a saturated straight-chain aliphatic acid, e. g., acetic, propionic, butyric, valeric, hexanoic, lauric, a saturated branched-chain aliphatic acid, e. g., trimethylacetic, isobutyric, isovaleric, a cycloaliphatic saturated acid, e. g., cyclohexane-carboxylic, an alkaryl acid, e. g., benzoic, phenylacetic, 2-phenylpropionic, o-, m-, and p-toluic, a saturated dibasic acid (which can be converted into water-soluble, e. g., sodium, salts), e. g., succinic, adipic, a monobasic unsaturated acid, e. g., acrylic, crotonic, undecylenic, propiolic, cinnamic, a dibasic unsaturated acid (which can be converted into water-soluble, e. g., sodium, salts), e. g., maleic and citraconic. The 17-acylates represented by Formula I (ester) are recovered by conventional means such as crystallization or chromatographic techniques.

An alternative and the preferred method for the preparation of the compounds of Formulae I and I(ester), when Y represents fluorine, for example, 6α,9α-difluoro-11β,17β-dihydroxy-17α-alkyl-4-androsten-3-ones, 6α,9α-difluoro-11β,17β-dihydroxy-17α-alkyl-4-androsten-3-one 17-acylates, 6α,9α-difluoro-17β-hydroxy-17α-alkyl-4-androstene-3,11-dione, 6α,9α-difluoro-17β-hydroxy-17α-alkyl-4-androstene-3,11-dione 17-acylates and their corresponding 19-nor compounds, is represented by the following reaction sequence:

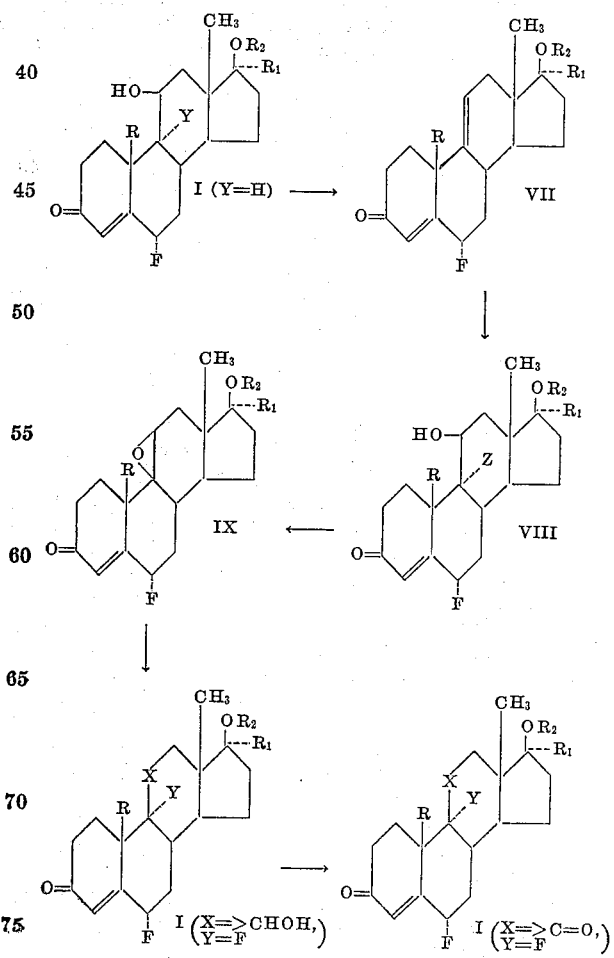

wherein R, $R_1$, and $R_2$ have the same meaning as previously given and Z represents a halogen having an atomic weight from 79 to 127 inclusive, i. e., bromine or iodine.

The compounds of Formula I (X=>CHOH, Y=F), for example, 6α,9α-difluoro-11β,17β-dihydroxy-17α-alkyl-4-androsten-3-ones and 6α,9α-difluoro-11β,17β-dihydroxy-17α-alkyl-19-nor-4-androsten-3-ones, and the compounds of Formula I (X=>C=O, Y=F), for example, 6α,9α-difluoro-17β-hydroxy-17α-alkyl-4-androstene-3,11-diones and 6α,9α-difluoro-17β-hydroxy-17α-alkyl-19-nor-4-androstene-3,11-diones are prepared by the method which comprises treating the compounds of Formula I (Y=H), according to procedures disclosed in U. S. Patent 2,793,218 as follows:

Compounds of the type represented by Formula I (Y=H), for example, 6α-fluoro-11β,17β-dihydroxy-17α-alkyl-4-androsten-3-ones and 6-fluoro-11β,17β-dihydroxy-17α-alkyl-19-nor-4-androsten-3-ones are treated according to the procedure disclosed in Example 2 of U. S. Patent 2,793,218 and there are thus-obtained the compounds of Formula VII, for example, 6α-fluoro-9(11)-dehydro-17β-hydroxy-17α-alkyl-4-androsten-3-ones and 6α-fluoro-9(11)-dehydro-17β-hydroxy-17α-alkyl-19-nor-4-androsten-3-ones. The compounds of Formula VII are then treated according to the procedure disclosed in Example 5 of U. S. Patent 2,793,218 and there are thus-produced the compounds of Formula VIII, for example, 6α-fluoro-9α-halo-11β,17β-dihydroxy-17α-alkyl-4-androsten-3-ones and 6α-fluoro-9α-halo-11β,17β-dihydroxy-17α-alkyl-19-nor-4-androsten-3-ones. The compounds of Formula VIII are then treated according to the procedure disclosed in Example 6 of U. S. Patent 2,793,218 and there are thus-obtained the compounds of Formula IX, for example, 6α-fluoro-9,-11β-epoxy-17β-hydroxy-17α-alkyl-4-androsten-3-ones and 6α-fluoro-9,11β-epoxy-17β-hydroxy-17α-alkyl-19-nor-4-androsten-3-ones. The compounds of Formula IX are then converted into the compounds of Formula I (X=>CHOH, Y=F), for example, 6α,9α-difluoro-11β,17β-dihydroxy-17α-alkyl-4-androsten-3-ones and 6α,9α-difluoro-11β,17β-dihydroxy-17α-alkyl-19-nor-4-androsten-3-ones, by following the procedure of Example 7 of U. S. Patent 2,793,218. The compounds of Formula I (X=>CHOH, Y=F) can then be treated according to the procedure disclosed in Example 10 of U. S. Patent 2,793,218 to obtain the compounds of Formula I (X=>C=O, Y=F), for example, 6α,9α-difluoro-17β-hydroxy-17α-alkyl-4-androstene-3,11-diones and 6α,9α-difluoro-17β-hydroxy-17α-alkyl-19-nor-4-androstene-3,11-diones.

The following examples are illustrative of the process and products of the present invention, but are not to be construed as limiting.

EXAMPLE 1

A. *17β-hydroxy-17α-methyl-5-androstene-3,11-dione 3-ethylene ketal (Compound IIIa)*

A stirred mixture containing seven grams of 17β-hydroxy-17α-methyl-4-androstene-3,11-dione (11-keto-17-methyltestosterone), Compound IIa, disclosed in U. S. Patent 2,678,933, 350 milliliters of benzene, seven milliliters of ethylene glycol and 42 milligrams of p-toluenesulfonic acid was heated at reflux for a period of four hours using a water separator to remove water of reaction. After refluxing, the mixture was cooled, washed with successive portions of dilute sodium carbonate solution and water and then dried over sodium sulfate. The solvent was removed under reduced pressure leaving a solid residue. The solid residue was then recrystallized from aqueous acetone containing two drops of pyridine to yield 5.48 grams (69 percent of theory) of product having a melting point of 175–181 degrees centigrade. Recrystallization from methylene chloride-Skellysolve B hexanes gave 17β-hydroxy-17α-methyl-5-androstene-3,11-dione 3-ethylene ketal, Compound IIIa, melting at 179– 184 degrees centigrade and having an $[α]_D$ minus 21 degrees ($CHCl_3$).

Analysis.—Calcd. for $C_{22}H_{32}O_4$: C, 73.29; H, 8.95. Found: C, 73.05; H, 8.80.

B. *5α-epoxy-17β-hydroxy-17α-methylandrostene-3,11-dione 3-ethylene ketal (Compound IVa)*

To an ice-water-bath cooled solution of six milliliters of forty percent peracetic acid and 0.6 gram of anhydrous sodium acetate there was added, with stirring a solution containing three grams of Compound IIIa dissolved in sixty milliliters of chloroform. The thus-obtained reaction mixture was stirred for a period of 105 minutes while maintaining the temperature at from zero to five degrees centigrade. The reaction mixture was then diluted with sixty milliliters of chloroform and sixty milliliters of a saturated aqueous sodium bicarbonate solution was added thereto, followed by stirring for five minutes. The thus-obtained mixture separated into an aqueous layer and an organic (chloroform solution) layer upon standing for a few minutes. The layers were separated and the chloroform solution layer was washed with water, dried over sodium sulfate and the solvent (chloroform) was removed under reduced pressure to yield a solid residue. The residue was then dissolved in a large volume of ether, concentrated to fifty milliliters, followed by cooling to zero degrees centigrade. Filtration followed by washing with a little ether and drying, yielded 2.208 grams (seventy percent of theory) of product melting at 203–212 degrees centigrade. Traces of the 5β,6β-epoxy compound (5β,6β-epoxy-17β-hydroxy-17α-methyl-androstane-3,11-dione 3-ethylene ketal) were removed by recrystallizing the 5α,6α-epoxy compound from methylene chloride-Skellysolve B hexanes. The recrystallized product, 5α,6α-epoxy-17β-hydroxy-17α-methylandrostane-3,11-dione 3-ethylene ketal, Compound IVa, melted at 219–225 degrees centigrade and had an $[α]_D$ minus 32 degrees ($CHCl_3$).

Analysis.—Calcd. for $C_{22}H_{32}O_5$: C, 70.17; H, 8.57. Found: C, 70.11; H, 8.29.

C. *6β-fluoro-5α,17β-dihydroxy-17α-methylandrostane-3,11-dione (Compound Va)*

2.39 grams of Compound IVa dissolved in 22 milliliters of methylene chloride is stirred with 8.3 milliliters of 48 percent hydrofluoric acid in a polyethylene bottle at room temperature for fifty minutes. The mixture thus-obtained is cautiously poured, whilst stirring, into a cold solution of twenty grams of sodium bicarbonate in 170 milliliters of water. The mixture is allowed to stand at room temperature for about thirty minutes, and the insoluble product therein is recovered by filtration, washed with water and methylene chloride and dried. Fluorine and infrared analyses show this crude product to contain 6β-fluoro-5α,17β-dihydroxy-17α-methylandrostane-3,11-dione, Compound Va. The crude product is then dissolved in a large volume of methylene chloride and chromatographed over fifty grams of Florisil (synthetic magnesium silicate) and eluted in 100-milliliter fractions with Skellysolve B hexanes plus increasing proportions of acetone from one to forty percent. Fractions 4–12, containing Compound Va, are combined and evaporated to dryness leaving 6β-fluoro-5α,17β-dihydroxy-17α-methylandrostane-3,11-dione as a residue.

D. *6α-fluoro-17-hydroxy-17α-methyl-4-androstene-3,11-dione(6α-fluoro-11-keto-17α-methyltestosterone) (Compound Ia)*

The Compound Va residue obtained in Example 1, Part C, above, is dissolved in 150 milliliters of chloroform and four milliliters of ethanol. The solution is cooled to approximately minus ten degrees centigrade and then treated with anhydrous hydrogen chloride gas for several hours while maintaining the temperature at approximately minus ten to zero degrees centigrade. The solution thus-obtained is washed with successive portions of water, saturated sodium bicarbonate solution and water, and then dried over sodium sulfate. The solution is evaporated to dryness and the residue obtained is recrystallized twice from aqueous acetone to yield 6α-fluoro-17β-hydroxy-17α-methyl-4-androstene-3,11-dione, Compound Ia, a crystalline solid that decomposes upon heating at the melting point.

E. *6α-fluoro-17β-hydroxy-17α-methyl-4-androstene-3,11-dione 17-propionate (6α - fluoro-11 - keto - 17α-methyltestosterone 17-propionate) [Compound Ia (ester)]*

One gram of Compound Ia in ten milliliters of propionic anhydride is heated at reflux, under nitrogen, until the reaction is substantially complete. The reaction mixture is then cooled, poured into 100 milliliters of water and stirred for several hours, followed by extraction with ether. The ethereal solution is then washed with successive portions of aqueous ten percent sodium hydroxide solution and water, dried over sodium sulfate, followed by removal of the ether by distillation. The residue remaining following distillation is dissolved in methylene chloride and chromatographed over 100 grams of Florisil followed by elution with Skellysolve B hexanes plus increasing proportions of acetone from five to fifty percent. The fractions are examined by infrared analysis and those showing no bands in the hydroxyl region are combined and crystallized to give 6α-fluoro-17β-hydroxy-17α-methyl-4-androstene - 3,11 - dione 17-propionate, Compound Ia(ester).

Similarly, by allowing Compound Ia to react with the appropriate hydrocarbon carboxylic acid anhydride, for example, at temperatures between 100 and 150 degrees centigrade, there are produced other 17-acylates of 6α-fluoro - 17β - hydroxy - 17α - methyl - 4 - androstene - 3,11-dione, such as 6α-fluoro-17β-hydroxy-17α-methyl-4-androstene-3,11-dione 17-acetate, 6α-fluoro-17β-hydroxy-17α-methyl-4-androstene-3,11-dione 17-butyrate, 6α-fluoro-17β-hydroxy-17α-methyl-4-androstene-3,11-dione 17-valerate, 6α-fluoro-17β-hydroxy-17α-methyl-4-androstene-3,11-dione 17-hexanoate, 6α-fluoro-17β-hydroxy-17α-methyl-4-androstene-3,11-dione 17-laurate, 6α-fluoro-17β-hydroxy-17α-methyl-4-androstene-3,11-dione 17-trimethylacetate, 6α-fluoro-17β-hydroxy-17α-methyl-4-androstene-3,11-dione 17-isobutyrate, 6α-fluoro-17β-hydroxy-17α-methyl-4-androstene-3,11-dione 17-isovalerate, 6α-fluoro - 17β - hydroxy - 17α - methyl - 4 - androstene - 3,11-dione 17-cyclohexane-carboxylate, 6α-fluoro-17β-hydroxy-17α-methyl-4-androstene-3,11-dione 17-benzoate, 6α - fluoro - 17β - hydroxy - 17α - methyl - 4 - androstene-3,11-dione 17-phenylacetate, 6α-fluoro-17β-hydroxy-17α-methyl-4-androstene-3,11-dione 17-(β-phenylpropionate), 6α-fluoro-17β-hydroxy-17α-methyl-4-androstene-3-11-dione 17-(o-, m-, p-toluate), 6α-fluoro-17β-hydroxy-17α-methyl-4-androstene-3,11-dione 17-hemisuccinate, which can be converted with dilute sodium hydroxide to its soluble sodium salt, 6α-fluoro-17β-hydroxy-17α-methyl-4-androstene-3,11-dione 17-hemiadipate, 6α-fluoro-17β-hydroxy-17α-methyl-4-androstene-3,11-dione 17-acrylate, 6α - fluoro - 17β - hydroxy - 17α - methyl - 4 - androstene - 3,11-dione 17-crotonate, 6α-fluoro-17β-hydroxy-17α-methyl-4-androstene-3,11-dione 17-undecylenate, 6α-fluoro-17β-hydroxy-17α-methyl-4-androstene-3,11-dione 17-propiolate, 6α-fluoro-17β-hydroxy-17α-methyl-4-androstene-3,11-dione 17-cinnamate, 6α-fluoro-17β-hydroxy-17α-methyl-4-androstene-3,11-dione 17-maleate, and 6α-fluoro-17β-hydroxy-17α-methyl-4-androstene-3,11-dione 17-citraconate. If the corresponding acid anhydride is solid an inert solvent such as toluene, xylene, or dioxane can be added to effect solution and to provide a liquid esterification reaction medium.

EXAMPLE 2

A. *17β-hydroxy-17α-methyl-5-androstene-3,11-dione 3-ethylene ketal (Compound IIIa)*

A stirred mixture containing 27 grams of Compound IIa, 1400 milliliters of benzene, 27 milliliters of ethylene glycol and 165 milligrams of p-toluenesulfonic acid was heated at reflux for a period of four and one-half hours using a water separator to remove the water of reaction. After refluxing, the mixture was cooled, washed with successive portions of dilute sodium bicarbonate solution and water and then dried over sodium sulfate. The solvent was removed under reduced pressure to give a solid residue of crude Compound IIIa.

B. *11β,17β-dihydroxy-17α-methyl-5-androsten-3-one 3-ethylene ketal (Compound VIb)*

The crude Compound IIIa, obtained in Example 3, Part A, above, was dissolved in 315 milliliters of tetrahydrofuran. The solution thus-obtained was added over a five minute period, under nitrogen, and with stirring, to a mixture of eighteen grams of lithium aluminum hydride in 720 milliliters of anhydrous ether. The mixture thus-obtained was stirred for fifteen minutes at room temperature and then whilst cooling in an ice bath, 225 milliliters of water were cautiously added, with stirring under nitrogen, thereto. The mixture was further diluted with 2700 milliliters of ether, stirred vigorously for thirty minutes and the ether solution was decanted and saved. The remaining sludge was extracted with three 100-milliliter portions of ether and the ether solutions so obtained were combined with the ether solution originally obtained. The combined ether solutions were washed with water and dried over sodium sulfate. Evaporation of the solvent gave a solid which was recrystallized from 350 milliliters of acetone to yield 22.087 grams of product melting at 228–235 degrees centigrade. The product so-obtained was again recrystallized from acetone to yield 11β,17β-dihydroxy-17α-methyl-5-androsten-3-one 3-ethylene ketal, Compound VIb, having a melting point of 232–236 degrees centigrade.

*Analysis.*—Calcd. for $C_{22}H_{34}O_4$: C, 72.89; H, 9.45. Found: C, 72.56; H, 9.39.

C. *5α,6α-epoxy,11β,17β-dihydroxy-17α-methylandrostan-3-one 3-ethylene ketal (Compound IVb)*

To 3.62 grams of Compound VIb, 72 milliliters of chloroform and 0.71 gram of anhydrous sodium acetate, cooled in an ice-water bath, there was added seven milliliters of forty percent peracetic acid. The cold reaction mixture thus-obtained was stirred vigorously for two hours, diluted with seventy milliliters of chloroform and seventy milliliters of aqueous saturated sodium bicarbonate solution and then stirred at room temperature for thirty minutes. Upon standing layer separation occurred and the organic (chloroform) layer was removed and saved. The aqueous layer was extracted twice with 200-milliliter portions of chloroform and these extracts were combined with the chloroform extract solution originally obtained. The combined chloroform extract solution was washed with water and dried over sodium sulfate. The chloroform solution was concentrated to seventy milliliters, cooled and the product which precipitated was recovered by filtration. A second crop was obtained by taking the filtrate to dryness and recrystallizing the residue thus-obtained from ethyl acetate-chloroform. The two crops combined gave 2.54 grams of a product decomposing above 280 degrees centigrade. 200 milligrams of the combined product was recrystallized from chloroform-ethyl acetate to yield 5α,6α-epoxy-11β,17β-dihydroxy - 17α - methylandrostan-3-one 3-ethylene ketal, Compound IVb, having a melting point of 285–295 degrees centigrade (with decomposition) and an $[α]_D$ minus nine degrees (pyridine).

*Analysis.*—Calcd. for $C_{22}H_{34}O_5$: C, 69.81; H, 9.05. Found: C, 69.56; H, 9.16.

D. *6β-fluoro-5α,11β,17β-trihydroxy-17α-methylandrostan-3-one (Compound Vb)*

To a solution of one gram of Compound IVb in fifteen milliliters of methylene chloride in a polyethylene bottle there is added three milliliters of 48 percent hydrofluoric acid. The reaction mixture is stirred vigorously at room temperature for several hours and then carefully poured, with stirring, into a mixture of six grams of sodium carbonate, 25 milliliters of water and 25 grams of ice. The mixture thus-obtained is stirred for a period of about fifteen minutes and upon standing layer separation occurs. The organic (methylene chloride) solution layer was removed and saved. The aqueous layer was extracted twice with fifty-milliliter portions of methylene chloride and these extracts were combined with the methylene chloride extract solution originally obtained. The combined methylene chloride extract solution is washed with water, dried over sodium sulfate, and the solvent removed to give a crude residue containing 6β-fluoro-5α,11β,17β-trihydroxy-17α-methylandrostan-3-one, Compound Vb. This crude residue is then dissolved in 25 milliliters of methylene chloride and chromatographed over fifteen grams of Florisil (synthetic magnesium silicate) and eluted in 25-milliliter fractions with Skellysolve B hexanes plus increasing proportions of acetone from one to fifty percent. Fractions 5 to 21, containing Compound Vb. are combined and evaporated to dryness leaving a residue.

E. *6α - fluoro - 11β,17β - dihydroxy - 17α - methyl - 4 - androsten - 3-one (6α-fluoro-11β-hydroxy-17α-methyltestosterone) (Compound Ib)*

To the Compound Vb residue obtained in Example 2, Part D, above, there is added 100 milliliters of chloroform and two milliliters of ethanol. The mixture is cooled to approximately minus ten degrees centigrade and then treated with anhydrous hydrogen chloride gas for several hours while maintaining the temperature of the solution at approximately minus ten to zero degrees centigrade. The solution thus-obtained is washed with successive portions of water, saturated sodium bicarbonate solution and water, dried over sodium sulfate and then the solvent is removed under reduced pressure leaving a residue. The residue is recrystallized from an acetone-Skellysolve B hexane mixture to give 6α-fluoro-11β,17β-dihydroxy-17α-methyl-4-androsten-3-one, Compound Ib, a crystalline solid which decomposes upon heating at the melting point.

F. *6α - fluoro - 11β,17β - dihydroxy - 17α - methyl - 4 - androsten-3-one 17-propionate (6α-fluoro-11β-hydroxy-17α-methyltestosterone) [Compound Ib(ester)]*

One gram of Compound Ib in ten milliliters of propionic anhydride is heated at reflux, under nitrogen, until the reaction is substantially complete. The reaction mixture is then cooled, poured into 100 milliliters of water and stirred for several hours, followed by extraction with ether. The ethereal solution is then washed with successive portions of aqueous ten percent sodium hydroxide solution and water, dried over sodium sulfate, followed by removal of the ether by distillation. The residue remaining following distillation is recrystallized from acetone-Skellysolve B hexanes to give 6α-fluoro-11β,17β-dihydroxy-17α-methyl-4-androsten-3-one 17-propionate, Compound Ib(ester), a crystalline solid, which decomposes upon heating at the melting point.

Similarly, by allowing Compound Ib to react with the appropriate hydrocarbon carboxylic acid anhydride, for example, at temperatures between 100 and 150 degrees centigrade there are produced other 17-acylates of 6α-fluoro - 11β,17β - dihydroxy - 17α - methyl - 4 - androsten-3-one, such as 6α-fluoro-11β,17β-dihydroxy-17α-methyl-4-androsten-3-one 17-acetate, 6α-fluoro-11β,17β-dihydroxy-17α-methyl-4-androsten-3-one 17-butyrate, 6α-fluoro - 11β,17β - dihydroxy - 17α - methyl - 4 - androsten - 3-one 17-valerate, 6α-fluoro-11β,17β-dihydroxy-17α-methyl-4-androsten-3-one 17-hexanoate, 6α-fluoro-11α,17β-dihydroxy - 17α - methyl-4-androsten-3-one 17-laurate, 6α-fluoro - 11β,17β - dihydroxy - 17α - methyl - 4 - androsten - 3-one 17-trimethylacetate, 6α-fluoro-11β,17β-dihydroxy-17α-methyl-4-androsten-3-one 17-isobutyrate, 6α-fluoro - 11β,17β - dihydroxy - 17α - methyl - 4 - androsten - 3-one 17-isovalerate, 6α-fluoro-11β,17β-dihydroxy-17α - methyl-4-androsten-3-one 17-cyclohexane-carboxylate, 6α - fluoro-11β,17β-dihydroxy-17α-methyl-4-androsten-3-one 17-benzoate, 6α-fluoro-11β,17β-dihydroxy-17α-methyl - 4 - androsten-3-one 17-phenylacetate, 6α-fluoro-11β,17β - dihydroxy - 17α - methyl - 4 - androsten - 3 - one 17 - (β - phenylpropionate), 6α-fluoro-11β,17β-dihydroxy-17α-methyl-4-androsten-3-one 17-(o-, m-, p-toluate), 6α - fluoro-11β,17β-dihydroxy-17α-methyl-4-androsten-3-one 17-hemisuccinate, which can be converted with sodium hydroxide to its water-soluble sodium salt, 6α-fluoro - 11β,17β - dihydroxy - 17α - methyl - 4 - androsten-3-one 17-hemiadipate, 6α-fluoro-11β,17β-dihydroxy-17α - methyl - 4 - androsten-3-one 17-acrylate, 6α-fluoro-11β,17β-dihydroxy-17α-methyl-4-androsten-3-one 17-crotonate, 6α - fluoro - 11β,17β - dihydroxy-17α-methyl-4-androsen - 3 - one 17-undecylenate, 6α-fluoro-11β,17β-dihydroxy - 17α - methyl-4-androsten-3-one 17-propiolate, 6α-fluoro - 11β,17β - dihydroxy - 17α - methyl - 4 - androsten-3-one 17-cinnimate, 6α - fluoro - 11β,17β - dihydroxy-17α-methyl-4-androsten-3-one 17-maleate, and 6α-fluoro-11β,17β - dihydroxy - 17α - methyl - 4 - androsten - 3-one 17-citraconate. If the corresponding acid anhydride is solid, an inert solvent such as toluene, xylene, or dioxane can be added to effect solution and to provide a liquid esterification medium.

EXAMPLE 3

*6α,9α - difluoro - 17β - hydroxy - 17α - methyl - 4 - androstene-3,11-dione (6α,9α-difluoro-11-keto-17α-methyltestosterone) and the 17-propionate thereof [Compounds Ic and Ic(ester), respectively]*

Substituting a stoichiometric equivalent of 9α - fluoro-17β - hydroxy - 17α-methyl-4-androsten-3,11-dione, Compound IIc, disclosed in U. S. Patent 2,793,218, for Compound IIa, in Example 1 there is obtained in consecutive order, 9α - fluoro - 17β-hydroxy-17α-methyl-5-androsten-3,11-dione 3-ethylene ketal, Compound IIIc (Part A), 5α,6α - epoxy - 9α - fluoro - 17β - hydroxy - 17α - methylandrostane - 3,11-dione 3-ethylene ketal, Compound IVc (Part B), 6β,9α - difluoro - 5α,17β - dihydroxy - 17α-methylandrostane-3,11-dione, Compound Vc (Part C), 6α,9α - difluoro - 17β - hydroxy - 17α - methyl - 4 - androstene-3,11-dione, Compound Ic (Part D), and 6α,9α-difluoro - 17β - hydroxy - 17α - methyl - 4 - androstene - 3,11-dione 17-propionate, Compound Ic(ester) (Part E).

EXAMPLE 4

*6α,9α - difluoro - 11β,17β - dihydroxy - 17α - methyl - 4-androsten - 3 - one (6α,9α - difluoro - 11β - hydroxy-17α-methyltestosterone) and the 17-propionate thereof [Compounds Id and Id(ester), respectively]*

Substituting a stoichiometric equivalent of 9α-fluoro-17β - hydroxy-17α-methyl-4-androstene-3,11-dione, Compound IIc, for Compound IIa, in Example 2, there is obtained, in consecutive order, 9α-fluoro-17β-hydroxy-17α-methyl-5- androstene-3,11-dione 3-ethylene ketal, Compound IIIc (Part A), 9α-fluoro-11β,17β-dihydroxy-17α-methyl-5-androsten-3-one 3-ethylene ketal, Compound VId (Part B), 5α,6α-epoxy-9α-fluoro-11β,17β-dihydroxy-17α-methylandrostane-3-one 3-ethylene ketal, Compound IVd (Part C), 6β,9α-difluoro-5α,11β,17β-trihydroxy-17α-methylandrostan-3-one, Compound Vd (Part D), 6α,9α - difluoro - 11β,17β - dihydroxy - 17α - methyl-4-androsten-3-one, Compound Id (Part E) and 6α,9α-difluoro - 11β,17β - dihydroxy - 17α - methyl - 4 - androsten-3-one, Compound Id(ester) (Part F).

Alternatively, Compounds Id and Id(ester) are prepared by substituting a stoichiometric equivalent of 9α-fluoro - 11β,17β - dihydroxy - 17α - methyl - 4 - androsten-3-one, disclosed in U. S. Patent 2,793,218, for Compound IIa, in Example 1. There is thus obtained in consecutive order, 9α-fluoro-11β,17β-dihydroxy-17α-methyl-5-androstene-3,11-dione 3-ethylene ketal (Part A), Compound IVd (Part B), Compound Vd(Part C), Compound Id (Part D), and Compound Id(ester) (Part F).

EXAMPLE 5

6α - fluoro - 17β - hydroxy - 17α - methyl - 19 - nor - 4-androstene - 3,11-dione (6α - fluoro - 11 - keto - 17α-methyl - 19 - nortestosterone) and the 17-propionate thereof [Compounds Ie and Ie(ester), respectively]

Substituting a stoichiometric equivalent of 17β-hydroxy-17α-methyl-19-nor-4-androstene-3,11-dione, Compound IIe, disclosed in U. S. Patent 2,678,933, for Compound IIa, in Example 1, there is obtained, in consecutive order, 17β-hydroxy-17α-methyl-19-nor-5-androstene-3,11-dione 3-ethylene ketal, Compound IIIe (Part A), 5α,6α-epoxy-17β-hydroxy-17α-methyl-19-norandrostane-3,11-dione 3-ethylene ketal, Compound IVe (Part B), 6β-fluoro-5α,17β-dihydroxy-17α-methyl-19-norandrostane-3,11-dione, Compound Ve(Part C), 6α-fluoro-17β - hydroxy - 17α - methyl - 19 - nor - 4 - androstene-3,11-dione, Compound Ie (Part D), and 6α-fluoro-17β-hydroxy - 17α - methyl - 19 - nor - 4 - androstene - 3,11-dione 17 propionate, Compound Ie(ester) (Part E).

EXAMPLE 6

6α - fluoro - 11β,17β - dihydroxy - 17α - methyl - 19 - nor-4-androsten-3-one (6α-fluoro-11β-hydroxy-17α-methyl-19-nortestosterone) and the 17-propionate thereof [Compounds If and If(ester), respectively]

Substituting a stoichiometric equivalent of 17β-hydroxy-17α-methyl-19-nor-4-androstene-3,11-dione, Compound IIe, for Compound IIa, in Example 2, there is obtained, in consecutive order, 17β-hydroxy-17α-methyl-19-nor-5-androstene-3,11-dione 3-ethylene ketal, Compound IIIe (Part A), 11β,17β-dihydroxy-17α-methyl-19-nor-5-androsten-3-one 3-ethylene ketal, Compound VIf (Part B), 5α,6α-epoxy-11β,17β-dihydroxy-17α-methyl-19-norandrostan-3-one 3-ethylene ketal, Compound IVf (Part C), 6β-fluoro-5α,11β,17β-trihydroxy-17α-methyl-19-norandrostan-3-one, Compound Vf (Part D), 6α-fluoro - 11β,17β - dihydroxy - 17α - methyl - 19 - nor - 4 - androsten-3-one, Compound If (Part E) and 6α-fluoro-11β,17β - dihydroxy - 17α - methyl - 19 - nor - 4 - androsten - 3 - one 17 - propionate, Compound If(ester) (Part F).

EXAMPLE 7

6α,9α - difluoro - 17β - hydroxy - 17α - methyl - 19 - nor-4 - androstene - 3,11 - dione (6α,9α - difluoro - 11-keto-17α-methyl-19-nortestosterone) and the 17-propionate thereof [Compounds Ig and Ig(ester), respectively]

Substituting a stoichiometric equivalent of 9α-fluoro-17β - hydroxy - 17α - methyl-19 - nor - 4 - androstene-3,11-dione, Compound IIg, for Compound IIa, in Example 1, there is obtained in consecutive order, 9α-fluoro - 17β - hydroxy - 17α - methyl - 19 - nor - 5-androstene-3,11-dione 3-ethylene ketal, Compound IIIg (Part A), 5α,6α-epoxy-9α-fluoro-17β-hydroxy-17α-methyl-19-norandrostane-3,11-dione 3-ethylene ketal, Compound IVg (Part B), 6α,9α-difluoro-5α,17β-dihydroxy-17α-methyl - 19 - norandrostane - 3,11 - dione, Compound Vg (Part C), 6α,9α-difluoro-17β-hydroxy-17α-methyl-19-nor-4-androstene-3,11-dione, Compound Ig (Part D) and 6α,9α - difluoro - 17β - hydroxy - 17α - methyl - 19-nor-4-androstene-3,11-dione 17-propionate, Compound Ig(ester) (Part E).

Compound IIg used as the starting material is prepared by treating the known compound 11α,17β-dihydroxy-17α-methyl-19-nor-androsten-3-one (11α-hydroxy-17-methyl-19-nortestosterone), disclosed in U. S. Patent 2,678,933, according to the procedure disclosed in U. S. Patent 2,793,218.

EXAMPLE 8

6α,9α - difluoro - 11β,17β - dihydroxy - 17α - methyl - 19-nor - 4 - androsten - 3 - one (6α,9α - difluoro - 11β-hydroxy-17α-methyl-19-nortestosterone) and the 17-propionate thereof [Compounds Ih and Ih(ester) respectively]

Substituting a stoichiometric equivalent of 9α-fluoro-17β - hydroxy - 17α - methyl - 19 - nor - 4 - androstene-3,11-dione, Compound IIg, for Compound IIa, in Example 2, there is obtained in consecutive order 9α-fluoro-17β - hydroxy - 17α - methyl - 19 - nor - 5 - androstene-3,11-dione 3-ethylene ketal, Compound IIIg (Part A), 9α - fluoro - 11β,17β - dihydroxy - 17α - methyl - 19 - nor-5-androsten-3-one 3-ethylene ketal, Compound VIh (Part B), 5α,6α - epoxy - 9α - fluoro - 11β,17β - dihydroxy-17α-methyl-19-norandrostan-3-one 3-ethylene ketal, Compound IVh (Part C), 6β-9α-difluoro-5α,11β,17β-trihydroxy-17α-methyl-19-norandrostan-3-one, Compound Vh (Part D), 6α,9α-difluoro-11β,17β-dihydroxy-17α-methyl-19-nor-4-androsten-3-one, Compound Ih (Part E) and 6α,9α - difluoro - 11β,17β-dihydroxy - 17α - methyl - 19-nor-4-androsten-3-one, Compound Ih(ester) (Part F).

Alternatively, Compounds Ih and Ih(ester) are prepared by substituting a stoichiometric equivalent of 9α-fluoro-11β,17β-dihydroxy-17α-methyl-19-nor-4-androsten-3-one, disclosed in U. S. Patent 2,793,218, for Compound IIa, in Example 1. There is thus obtained in consecutive order, 9α-fluoro-11β,17β-dihydroxy-17α-methyl-19-nor-5-androsten-3-one 3-ethylene ketal (Part A), Compound IVh (Part B), Compound Vh (Part C), Compound Ih (Part D), and Compound Ih(ester) (Part E).

EXAMPLE 9

6α,9 -difluoro-17β-hydroxy-17α-methyl-4-androstene-3,11-dione

Substituting a stoichiometric equivalent amount of 6α-fluoro-11β,17β-dihydroxy-17α-methyl-4-androsten-3-one, Compound Ib, for 11β,17β - dihydroxy - 17α - methyl-4-androsten-3-one in Example 2 of U. S. Patent 2,793,218 and following the procedures disclosed in Examples 2, 5, 6, 7, and 10 of the patent there is obtained, in consecutive order, 6α - fluoro - 9(11)- dehydro-17β-hydroxy-17α-methyl-4-androsten-3-one, 6α-fluoro-9α-bromo-11β,17β-dihydroxy-17α-methyl-4-androsten-3-one, 6α-fluoro-9,11β-epoxy-17β-hydroxy-17α-methyl-4-androsten-3-one, 6α,9α-difluoro-11β,17β-dihydroxy-17α-methyl-4-androsten-3-one, and 6α,9α-difluoro-17β-hydroxy-17α-methyl-4-androstene-3,11-dione, respectively.

Similarly, substituting a stoichiometric equivalent amount of 6α-fluoro-11β,17β-dihydroxy-17α-methyl-4-androsten-3-one 17-propionate, Compound Ib(ester), for 11β,17β-dihydroxy-17α-methyl-4-androsten-3-one in Example 2 of U. S. Patent 2,793,218 and following the procedures disclosed in Examples 2, 5, 6, 7, and 10 of the patent there is obtained, in consecutive order, 6α-fluoro-9(11)-dehydro-17β-hydroxy-17α-methyl-4-androsten-3-one 17-propionate, 6α-fluoro-9α-bromo-11β,17β-dihydroxy-17α-methyl-4-androsten-3-one 17-propionate, 6α-fluoro-9,11β-epoxy-17β-hydroxy-17α-methyl-4-androsten-3-one 17-propionate, 6α,9α-difluoro-11β,17β-dihydroxy-17α-methyl-4-androsten-3-one 17 propionate, and 6α,9α-difluoro-17βhydroxy-17α-methyl-4-androstene-3,11-dione 17-propionate, respectively.

EXAMPLE 10

*6α,9α-difluoro-17β-hydroxy-17α-methyl-19-nor-4-androstene 3,11-dione*

Substituting a stoichiometric equivalent amount of 6α-fluoro-11β,17β-dihydroxy-17α-methyl-19-nor-4-androsten-3-one, Compound I*f*, for 11β,17β-dihydroxy-17α-methyl-19-nor-4-androsten-3-one in Example 2 of U. S. Patent 2,793,218 and following the procedures disclosed in Examples 2, 5, 6, 7, and 10 of the patent there is obtained, in consecutive order, 6α-fluoro-9(11)-dehydro-17β-hydroxy-17α-methyl-19-nor-4-androsten-3-one, 6α-fluoro-9α-bromo-11β,17β-dihydroxy-17α-methyl-19-nor-4-androsten-nor-4-androsten-3-one, 6α,9α-difluoro-11β,17β-dihydroxy-17α-methyl-19-nor-4-androsten-3-one, and 6α,9α-difluoro-17β-hydroxy-17α-methyl-19-nor-4-androstene-3,11-dione, respectively.

Similarly, substituting a stoichiometric equivalent amount of 6α-fluoro-11β,17β-dihydroxy-17α-methyl-19-nor-4-androsten-3-one 17-propionate, Compound I*f*(ester), for 11β,17β-dihydroxy-17α-methyl-19-nor-4-androsten-3-one in Example 2 of U. S. Patent 2,793,218 and following the procedures disclosed in Examples 2, 5, 6, 7, and 10 of the patent there is obtained, in consecutive order, 6α-fluoro-9(11)-dehydro-17β-hydroxy-17α-methyl-19-nor-4-androsten-3-one 17-propionate, 6α-fluoro-9α-bromo-11β,17β-dihydroxy-17α-methyl-19-nor-4-androsten-3-one 17-propionate, 6α-fluoro-9,11β-epoxy-17β-hydroxy-17α-methyl-19-nor-4-androsten-3-one 17-propionate, 6α,9α-difluoro-11β,17β-dihydroxy-17α-methyl-19-nor-4-androsten-3-one 17-propionate, and 6α,9α-difluoro-17β-hydroxy-17α-methyl-19-nor-4-androstene-3,11-dione 17-propionate, respectively.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. 6α-fluoro-11-oxygenated-17α-alkyl compounds of the androstene series having the formula:

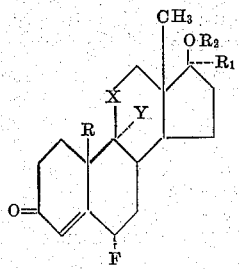

wherein R is selected from the group consisting of hydrogen and methyl, $R_1$ is an alkyl radical containing from one to eight carbon atoms, inclusive, $R_2$ is selected from the group consisting of hydrogen and the acyl radical of a hydrocarbon carboxylic acid containing from one to twelve carbon atoms, inclusive, Y is selected from the group consisting of hydrogen and fluorine and X is selected from the group consisting of >CHOH and >C=O.

2. 6α-fluoro-17β-hydroxy-17α-alkyl-4-androstene-3,11-dione in which the alkyl radical contains from one to eight carbon atoms, inclusive.

3. 6α-fluoro-17β-hydroxy-17α-methyl-4-androstene-3,11-dione.

4. 6α-fluoro-17β-hydroxy-17α-alkyl-4-androstene-3,11-dione 17-acylate in which the alkyl radical contains from one to eight carbon atoms, inclusive, and the acyl radical is that of a hydrocarbon carboxylic acid containing from one to twelve carbon atoms, inclusive.

5. 6α-fluoro-17β-hydroxy-17α-methyl-4-androstene-3,11-dione 17-propionate.

6. 6α-fluoro-11β,17β-dihydroxy-17α-alkyl-4-androsten-3-one in which the alkyl radical contains from one to eight carbon atoms, inclusive.

7. 6α-fluoro-11β,17β,dihydroxy-17α-methyl-4-androsten-3-one.

8. 6α-fluoro-11β,17β-dihydroxy-17α-alkyl-4-androsten-3-one 17-acylate in which the alkyl radical contains from one to eight carbon atoms, inclusive, and the acyl radical is that of a hydrocarbon carboxylic acid containing from one to twelve carbon atoms, inclusive.

9. 6α - fluoro - 11β,17β - dihydroxy - 17α - methyl-4-androsten-3-one 17-propionate.

10. 6α,9α - difluoro - 17β - hydroxy - 17α - alkyl - 4-androstene-3,11-dione in which the alkyl radical contains from one to eight carbon atoms, inclusive.

11. 6α,9α - difluoro - 17β - hydroxy - 17α - methyl - 4-androstene-3,11-dione.

12. 6α,9α-difluoro - 17β - hydroxy - 17α - alkyl - 4-androstene-3,11-dione 17-acylate in which the alkyl radical contains from one to eight carbon atoms, inclusive, and the acyl radical is that of a hydrocarbon carboxylic acid containing from one to twelve carbon atoms, inclusive.

13. 6α,9α - difluoro - 17β - hydroxy - 17α - methyl-4-androstene-3,11-dione 17-propionate.

14. 6α,9α - difluoro - 11β,17β - dihydroxy - 17α-alkyl-4-androsten-3-one in which the alkyl radical contains from one to eight carbon atoms, inclusive.

15. 6α,9α - difluoro - 11β,17β - dihydroxy-17α-methyl-4-androsten-3-one.

16. 6α,9α - difluoro - 11β,17β - dihydroxy - 17α-alkyl-4-androsten-3-one 17-acylate in which the alkyl radical contains from one to eight carbon atoms, inclusive, and the acyl radical is that of a hydrocarbon carboxylic acid containing from one to twelve carbon atoms, inclusive.

17. 6α,9α - difluoro - 11β,17β - dihydroxy - 17α-methyl-4-androsten-3-one 17-propionate.

18. 6β - fluoro - 11 - oxygenated - 5α - hydroxy - 17α-alkyl compounds of the androstane series having the formula:

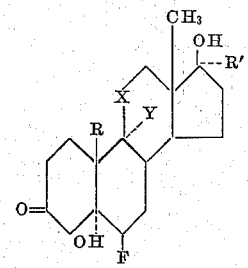

wherein R is selected from the group consisting of hydrogen and methyl, $R_1$ is an alkyl radical containing from one to eight carbon atoms, inclusive, Y is selected from the group consisting of hydrogen and fluorine and X is selected from the group consisting of >CHOH and >C=O.

19. 6β - fluoro - 5α,17β - dihydroxy - 17α - alkyl-androstane-3,11-dione in which the alkyl radical contains from one to eight carbon atoms, inclusive.

20. 6β - fluoro - 5α,17β - dihydroxy - 17α - methyl-androstane-3,11-dione.

21. 6β - fluoro - 5α,11β,17β - trihydroxy - 17α - alkyl-androstan-3-one in which the alkyl radical contains from one to eight carbon atoms, inclusive.

22. 6β - fluoro - 5α,11β,17β - trihydroxy - 17α - methyl-androstan-3-one.

23. 6β,9α - difluoro - 5α,17β - dihydroxy - 17α-alkyl-androstane-3,11-dione in which the alkyl radical contains from one to eight carbon atoms, inclusive.

24. 6β,9α - difluoro - 5α,17β - dihydroxy - 17α-methyl-androstane-3,11-dione.

25. 6β,9α - difluoro - 5α,11β,17β - trihydroxy - 17α-alkylandrostan-3-one in which the alkyl radical contains from one to eight carbon atoms, inclusive.

26. 6β,9α - difluoro - 5α,11β,17β - trihydroxy - 17α-methylandrostan-3-one.

27. 5α,6α-epoxy - 11 - oxygenated - 17α - alkyl compounds of the androstane series having the formula:

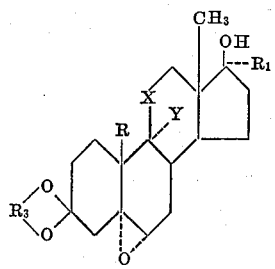

wherein R is selected from the group consisting of hydrogen and methyl, R₁ is an alkyl radical containing from one to eight carbon atoms, inclusive, R₃ is an alkylene radical containing not more than eight carbon atoms, inclusive, and the attaching oxygen to carbon bonds are separated by a chain of at least two and not more than three carbon atoms, Y is selected from the group consisting of hydrogen and fluorine and X is selected from the group consisting of >CHOH and >C=O.

28. 5α,6α - epoxy - 17β - hydroxy - 17α - methylandrostane-3,11-dione 3-ethylene ketal.

29. 5α,6α - epoxy - 11β,17β - dihydroxy - 17α - methylandrostan-3-one 3-ethylene ketal.

30. 5α,6α - epoxy - 9α - fluoro - 17β - hydroxy - 17α-methylandrostane-3,11-dione 3-ethylene ketal.

31. 5α,6α - epoxy - 9α - fluoro - 11β,17β - dihydroxy-17α-methyl-androstan-3-one 3-ethylene ketal.

32. 6α - fluoro - 17α - alkyl compounds of the androstane series having the formula:

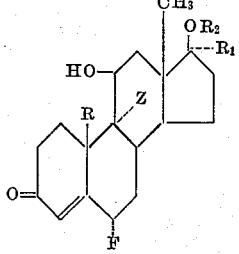

wherein R is selected from the group consisting of hydrogen and methyl, R₁ is an alkyl radical containing from one to eight carbon atoms, R₂ is selected from the group consisting of hydrogen and the acyl radical of a hydrocarbon carboxylic acid containing one to twelve carbon atoms, inclusive, and Z is a halogen having an atomic weight of from 79 to 127.

33. 6α - fluoro - 9α - bromo - 11β,17β - dihydroxy-17α-methyl-4-androsten-3-one.

34. 6α - fluoro - 9α - bromo - 11β,17β - dihydroxy-17α-methyl-4-androsten-3-one 17-propionate.

35. 6α - fluoro - 9(11)-dehydro-17α-alkyl compounds of the androstane series having the formula:

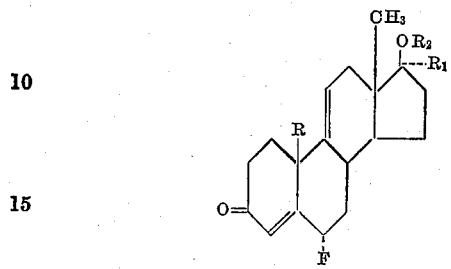

wherein R is selected from the group consisting of hydrogen and methyl, R₁ is an alkyl radical containing from one to eight carbon atoms, inclusive, and R₂ is selected from the group consisting of hydrogen and the acyl radical of a hydrocarbon carboxylic acid containing from one to twelve carbon atoms, inclusive.

36. 6α - fluoro - 9(11) - dehydro - 17β - hydroxy-17α-methyl-4-androsten-3-one.

37. 6α - fluoro - 9(11) - dehydro - 17β - hydroxy-17α-methyl-4-androsten-3-one 17-propionate.

38. 6α - fluoro - 9,11β - epoxy - 17α-alkyl compounds of the androstane series having the formula:

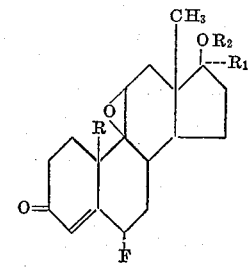

wherein R is selected from the group consisting of hydrogen and methyl, R₁ is an alkyl radical containing from one to eight carbon atoms, inclusive, and R₂ is selected from the group consisting of hydrogen and the acyl radical of a hydrocarbon carboxylic acid containing from one to twelve carbon atoms, inclusive.

39. 6α - fluoro - 9,11β - epoxy - 17β - hydroxy - 17α-methyl-4-androsten-3-one.

40. 6α - fluoro - 9,11β - epoxy - 17β - hydroxy - 17α-methyl-4-androsten-3-one 17-propionate.

No references cited.